(12) United States Patent
Chapat et al.

(10) Patent No.: US 7,357,905 B2
(45) Date of Patent: Apr. 15, 2008

(54) PROCESS FOR ELIMINATING SULFUR-CONTAINING COMPOUNDS BY DIRECT OXIDATION

(75) Inventors: Jean-François Chapat, Salindres (FR); Christophe Nedez, Salindres (FR); Jean-Louis Ray, Neuilly sur Seine (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 394 days.

(21) Appl. No.: 10/887,296

(22) Filed: Jul. 9, 2004

(65) Prior Publication Data

US 2005/0100495 A1    May 12, 2005

(30) Foreign Application Priority Data

Jul. 11, 2003  (FR) .................................. 03 08560

(51) Int. Cl.
 *C01B 17/02* (2006.01)
 *C01B 17/04* (2006.01)
 *C01B 17/96* (2006.01)

(52) U.S. Cl. ........................ 423/244.01; 423/244.06; 423/244.07; 423/244.09; 423/244.1; 423/544; 423/567.1; 423/573.1; 423/576.8

(58) Field of Classification Search ........... 423/244.01, 423/244.06, 244.09, 244.1, 544, 567.1, 573.1, 423/576.8, 244.07
See application file for complete search history.

(56) References Cited

U.S. PATENT DOCUMENTS 4,478,800 A * 10/1984 van der Wal et al. ....... 423/230
4,814,159 A    3/1989 Voirin
5,152,970 A    10/1992 van der Wal et al.
5,264,194 A *  11/1993 Fox et al. .................... 423/231
6,024,933 A *  2/2000 Legendre et al. .......... 423/567.1

FOREIGN PATENT DOCUMENTS

| EP | 0 324 091 | 7/1989 |
| FR | 2 538 716 | 7/1984 |
| FR | 2 540 092 | 8/1984 |
| WO | WO 94 21555 | 9/1994 |

OTHER PUBLICATIONS

The English abstract of WO 94/21555 A1 published on Sep. 29, 1994.*
The English abstract of FR 2 538 716 A published on Jul. 6, 1984.*
The English translation of FR 2,538,716 A1 to Dupin et al. published on Jul. 6, 1984.*

* cited by examiner

*Primary Examiner*—Timothy C. Vanoy
(74) *Attorney, Agent, or Firm*—Millen, White, Zelano, Branigan, P.C.

(57) ABSTRACT

The invention relates to a process for direct oxidation into sulfur and/or into sulfate of sulfur-containing compounds that are contained in an amount that is less than 10% by volume in a gas, in which said gas is brought into contact with an oxidation catalyst that comprises a substrate and an active phase that comprises iron in a proportion of between 2 and 5% by weight of the oxidation catalyst at a temperature of less than 200° C. and in the presence of oxygen.

10 Claims, No Drawings

PROCESS FOR ELIMINATING SULFUR-CONTAINING COMPOUNDS BY DIRECT OXIDATION

This invention relates to a process for treating gases, in particular industrial gaseous effluents that contain sulfur-containing compounds, for the purpose of the catalytic transformation of these compounds into products that can be easily and properly eliminated. It relates more particularly to a process for direct oxidation of sulfur-containing compounds, such as hydrogen sulfide $H_2S$, COS and $CS_2$, into sulfur $S_x$ and/or into sulfates.

A standard process for desulfurization of gas obtained in particular from natural gas or petroleum, used industrially, is the Claus process. After separation by an absorption conducted with amines, a heat treatment is conducted on the so-called acid gas that is obtained, in the presence of an addition of air, at a temperature that is in general between 900 and 1300° C. The reaction (1) is conducted in such a way as to strive for, at the outlet of this treatment, a molar ratio of 2 between $H_2S$ and $SO_2$.

$$H_2S + 3/2\ O_2 \rightarrow H_2O + SO_2 \qquad (1)$$

In the same step, about 70% of the sulfur-containing compounds are transformed into elementary sulfur $S_x$. In addition, it is known that the presence, in the gases to be treated, of hydrocarbons and $CO_2$ leads to the formation of by-products such as COS and $CS_2$ that cannot be transformed by the Claus reaction (2) and that reduce the final rate of conversion of the sulfur.

During a second stage that is catalytic, the task at hand will be to continue the transformation into sulfur of all of the sulfur-containing compounds that are present, according to the so-called Claus reaction (2) such as hydrolysis reactions (3) and (4) among cascade reactors, of which there are in general 2 or 3.

$$2\ H_2S + SO_2 \rightarrow 3/x\ S_x + 2\ H_2O \qquad (2)$$

$$CS_2 + 2\ H_2O \rightarrow CO_2 + 2\ H_2S \qquad (3)$$

$$COS + H_2O \rightarrow CO_2 + H_2S \qquad (4)$$

Smaller discharges of toxic effluents thus will be directly linked to the use of catalyst(s) that effectively convert(s) $H_2S$, COS and $CS_2$. The Claus reaction is generally used in successive reactors at decreasing temperatures that are higher than 200° C.

According to the number of reactors used, at the outlet of the Claus unit and after separation of sulfur $S_x$, generally a gaseous effluent that comprises between about 2% and about 5% of $H_2S$ by volume and up to 1 or 2% by volume of $CS_2$ and COS is obtained.

Several processes and methods have been proposed to go further in the levels of recovery of sulfur and purification of effluents that are obtained from desulfurization so as to limit as well as possible any polluting emission in the atmosphere, in particular $H_2S$, COS and $CS_2$.

French Patent 2 538 716 proposes using, for example, a final reaction zone in which a catalyst that comprises a metal is used in the presence of oxygen and at a temperature of between 200° C. and 300° C. to continue the Claus reaction and to obtain a purified effluent.

Patent Application WO 94/21555 describes a process for elimination of hydrogen sulfide that is contained in a concentration that is less than 5% by volume in a gas that uses a catalyst whose active phase consists of an oxide and a metallic salt. Contrary to this application, this application does not disclose the unexpected advantages that are linked to the specific use of iron in the active phase.

Patent EP 0 324 091 describes a process in which a mass that contains iron as an active phase is used for the elimination of hydrogen sulfide and in which said mass is regenerated. This patent does not disclose the unexpected advantages that are linked to the use of proportions of iron used as an active phase according to this application.

According to this process, a direct oxidation of the sulfur-containing compounds, such as $H_2S$, COS and $CS_2$ that are contained in the gaseous effluents obtained by, for example, a Claus process, is carried out so as to transform a major portion of it, and even all of it, into elementary sulfur and/or into sulfates. The oxidation is used in the presence of a gas that comprises oxygen, most often pure oxygen, at a temperature that is less than the dew point of sulfur, i.e., less than 200° C. The advantage of working at such a temperature is, on the one hand, to be able to recover the sulfur in liquid and/or solid form in the porosity of the catalyst, and, on the other hand, to shift the thermodynamic equilibrium of the reaction in the direction that is favorable to the formation of sulfur.

In this process, contrary to the known processes that use the Claus reaction, an effort is made, furthermore, to carry out a direct oxidation of the hydrogen sulfide into sulfur by minimizing the simultaneous formation of sulfur dioxide that ultimately involves a loss in the gas scrubbing yield.

According to this invention, a catalyst that promotes the transformation of $H_2S$ into sulfur $S_x$, i.e., that exhibits a strong activity, is used by minimizing, however, the oxidation of $H_2S$ into $SO_2$, i.e., high selectivity.

More specifically, this invention relates to a process for direct oxidation into sulfur and/or into sulfate of sulfur-containing compounds that are generally contained in an amount of less than 10% by volume in a gas that is typically obtained from a Claus unit, in which said gas is brought into contact at a temperature that is less than 200° C. and in the presence of oxygen with an oxidation catalyst that comprises a substrate and an active phase that comprises iron in a proportion of between 2 and 5% of the total weight of the oxidation catalyst.

The iron element content of the catalyst according to the invention is between 2% and 5% by weight, preferably between 2 and 4.9%, and even between 2 and 4.8% and more advantageously between 2.5 and 5% by weight.

Said catalyst most often exhibits an active phase with an iron base that can come in the form of at least one oxide and an iron salt, the latter able to be selected from among, for example, nitrate, sulfate, iron chloride, without this list being considered as limiting.

According to the invention, the catalyst that is described above is used for the direct oxidation of sulfur-containing compounds, such as $H_2S$, COS and $CS_2$, into elementary sulfur. Most often, the treated gases comprise up to 5% by volume of hydrogen sulfide H2S and sometimes also up to 2% by volume of COS and/or CS2.

This use makes it possible in particular to treat effluents that contain amounts of $H_2S$ that are less than 5% by volume, and even 2% by volume.

The catalyst, used according to the invention for the direct oxidation of sulfur-containing compounds into sulfur and/or sulfates at a temperature of less than 200° C., comprises an active phase that comprises iron and a substrate, preferably based on titanium dioxide, zirconia, silica, silica-alumina or alumina, whereby said silica, silica-alumina and alumina exhibit a specific surface area of at least 20 m²/g and a total pore volume of at least 0.3 cm³/g. The substrate of the catalyst according to the invention is preferably based on alumina, silica or silica-alumina.

The alumina, silica or silica-alumina exhibits a BET specific surface area of at least 20 m$^2$/g, preferably at least 40 m$^2$/g. The total pore volume (VPT) of such a substrate will then be at least 03. cm$^3$/g, preferably at least 0.4 cm$^3$/g.

The active phase of the catalyst can also comprise at least one element other than iron that is selected from among: titanium, nickel, cobalt, tin, germanium, gallium, ruthenium, antimony, niobium, manganese, vanadium, chromium, phosphorus, zinc, bismuth and yttrium. According to an alternative version of the invention, the active phase of the catalyst can comprise at least one element other than iron that is selected from among the group of alkalines, the group of alkaline-earths, and the group of rare earths.

The applicant has found that the combination of iron in the above-mentioned proportions with one of the preceding elements and more particularly with cobalt, tin, ruthenium, and potassium, for weight contents of elements other than iron encompassed between 1 and 100% relative to the weight of iron, preferably encompassed between 1 and 80% relative to the weight of iron, and very preferably between 5 and 80% relative to the weight of iron, made it possible to increase significantly the activity of the catalyst without substantially reducing its selectivity.

Usually, the catalysts according to the invention will come in the form of balls, but any other form can be considered (extruded, crushed, honeycombed, powders, . . . ), obtained by any technique that is known to one skilled in the art. The catalyst, for example, can come in the form of balls with a diameter of between 1 and 10 mm, preferably between 1 and 6 mm, or in the form of extrudates with a cross-section of between 0.7 and 5 mm, preferably between 1 and 3 mm.

The catalyst can be obtained, for example, by deposition on a substrate, already prepared, of catalytically active elements that were described above or by their precursors.

According to a possible method of preparation, an alumina substrate can be obtained by preparation of a powder by standard processes such as the precipitation or the formation of a gel, or by rapid dehydration of an alumina hydroxide such as hydrargillite. This last alumina is the one that is preferred according to the invention.

The deposition of the active phase on or in the substrate can be carried out by any method that is known by one skilled in the art. It can be carried out, for example, by impregnation. The catalyst can then be subjected to an operation of drying and optionally calcination, whereby this last operation can be carried out, for example, at a temperature that is located between 200 and 1000° C., preferably between 300 and 800° C.

The contact period of the reaction medium with the catalyst can range from 0.5 to 20 s, preferably 1 to 10 s, and even 2 to 8 s, whereby theses values are provided under the normal temperature and pressure conditions (CNTP).

The oxidation is used according to the invention with a volumetric ratio of O$_2$/sulfur-containing compounds of between 0.5 and 3, preferably between 1 and 2.

According to a preferred method, an amount of water vapor of between about 1% and 40% by volume, preferably between about 5 and 35%, is introduced into the reaction zone.

In the operational phase, in a first step, the gas with added oxygen is sent to the catalyst according to the invention at a temperature of between about 50 and 190° C., preferably between about 80 and 180° C., and very preferably between about 100 and 170° C. In a second step, the catalyst that is loaded with sulfur is flushed with an oxygen-free gas at a temperature of between 200 and 500° C. to regenerate the former.

The following examples illustrate the invention and its advantages without, however, limiting its scope.

EXAMPLE 1

Preparation of Catalysts According to the Invention

Different types of substrates have been prepared according to the rules of the art. The characteristics of these substrates are presented in Table I.

TABLE 1

Substrates that are Selected for the Study

| Type | SBE (m$^2$/g) | VPT (cm$^3$/g) | Granulo. (mm) | $V_{100 Å}$ (ml/100 g) | $V_{0.1 \mu m}$ (ml/100 g) |
|---|---|---|---|---|---|
| 1 Alumina balls | 195 | 0.77 | 2.0-3.2 | 0.51 | 0.32 |
| 2 Alumina extrudates | 225 | 0.65 | 1.6 | 0.38 | 0.02 |
| 3 TiO$_2$ extrudates | 127 | 0.35 | 3.5 | 0.29 | 0.11 |

SBE: specific surface area,
VPT: total pore volume,
Granulo.: grain size

The preparation of the catalysts was duly conducted by dry impregnation of the thus prepared substrates. The precursors selected for the impregnation were in sulfate form for iron, nickel and cobalt, and in chloride form for ruthenium and tin (see Example 2). The impregnated substrate was dried for 4 hours at 90° C., then calcined at 350° C. for 2 hours.

Table II collects the compositions (active phase/substrate) of the catalysts that are thus synthesized.

EXAMPLE 2

Catalytic Test

The operating procedure of the catalytic test that is carried out takes place in three stages.

The catalysts that are synthesized in Example 1 are first subjected to a pre-aging so as to test them under conditions of normal use. This pre-aging consists of a sulfurization at 140° C. by running for 20 hours of an effluent whose mean composition by volume is: 1.5% of H$_2$S, 2.4% of O$_2$, 30% of H$_2$O, and 66.1% of N$_2$.

The catalysts have then been subjected to a regeneration at 300° C. by running for 6 hours of an effluent whose mean composition by volume is: 30% of H$_2$O, 70% of N$_2$, then running for 8 hours of another effluent whose mean composition by volume is: 2.6% of H$_2$S, 30% of H$_2$O, and 67.4% of N$_2$.

Finally, the direct oxidation reaction is conducted at 140° C. by running of an effluent that comprises by volume: 2500 ppm of H$_2$S, 4000 ppm of O$_2$, 30% of H$_2$O, and 69.35% of N$_2$.

During this last stage, the conversion α of H$_2$S and yield β into SO$_2$ are measured for a reaction time of 8 hours and a contact time of 2 seconds. The results of the different tests are summarized in Table II.

TABLE II

Catalytic Performance Levels of Catalysts

| Test | Composition (% by Weight/ Substrate) | Substrate | α: Conversion of $H_2S$ (% Volume) | β: Formation of $SO_2$ (% Volume) |
|---|---|---|---|---|
| 1 | 0.4% Fe | 1 | 61% | 25% |
| 2 | 1.8% Fe | 1 | 70% | 17% |
| 3 | 2.5% Fe | 1 | 79% | 1% |
| 4 | 3.6% Fe | 1 | 82% | 0% |
| 5 | 4.9% Fe | 1 | 83% | 0% |
| 6 | 7% Fe | 1 | 83% | 18% |
| 7 | 12% Fe | 1 | 84% | 25% |
| 8 | 3.8% Fe-0.8% Co | 1 | 100% | 2% |
| 9 | 3.8% Fe-1% Sn | 1 | 88% | 0% |
| 10 | 3.8% Fe-0.3% Ru | 1 | 95% | 1% |
| 11 | 2.5% Fe-2% K | 1 | 84% | 0% |
| 12 | 3.7% Fe | 2 | 85% | 1% |
| 13 | 2.4% Fe | 3 | 92% | 4% |
| 14 | 4% Ni | 1 | 81% | 21% |
| 15 | 4% Co | 1 | 84% | 36% |

The results show the substantial advantages that are linked to the use of iron as an active phase in proportions of between 2 and 5% by weight, for a direct oxidation application of the $H_2S$ at a low temperature:

- at low concentration of iron (>2% by weight), the activity (conversion of $H_2S$) of the catalyst is low for a very poor selectivity (significant $SO_2$ formation);
- at very high concentration of iron (>5% by weight), the conversion is approximately constant whereas the selectivity decreases greatly.

The comparison of the activities and selectivity observed for nickel and cobalt (tests 14 and 15) do not show a gain of the same nature, in the range of concentration being considered (2-5%), for these two metals.

This invention therefore makes it possible to select, in an entirely unexpected way, a very particular range of the iron content that makes it possible to make gains on the two tables studied: activity and selectivity. Such behavior has not been determined in the other known metals of the prior art, in such an application.

Furthermore, tests 8 to 11 also show that the combination of iron with a second element that is selected from the list described above makes it possible to increase in a significant way the activity of the catalyst for the oxidation reaction of the hydrogen sulfide, without substantially reducing its selectivity.

The invention claimed is:

1. A process for direct oxidation into sulfur and/or into sulfates of sulfur-containing compounds that are contained in a gas and that comprise COS and/or CS2 up to 2% by volume, said process comprising bringing said gas into contact at a temperature of 100° to 170° C. and in the presence of oxygen with an oxidation catalyst that comprises a substrate and an active phase that comprises iron in a proportion of between 2.5 and 5% of the total weight of the oxidation catalyst, and at least one additional element other than iron, which additional element is tin, ruthenium or potassium.

2. The process according to claim 1, in which said sulfur-containing compounds also comprise up to 5% by volume of hydrogen sulfide $H_2S$.

3. The process according to claim 1, in which the oxygen/sulfur-containing compounds ratio is between 0.5 and 3.

4. The process according to claim 1, in which an amount of water vapor of between 1% and 40% by volume is introduced into the contact zone.

5. The process according to claim 1, in which said substrate is based on titanium dioxide, zirconia, silica, silica-alumina or alumina that has a specific surface area of at least 20 m$^2$/g and a total pore volume of at least 0.3 cm$^3$/g.

6. The process according to claim 1, in which the contact time of the reaction medium with the catalyst is between 0.5 and 20 seconds under normal conditions of temperature and pressure (CNTP).

7. A process for direct oxidation into sulfur and/or into sulfates of sulfur-containing compounds that are contained in a gas and that comprise COS and/or CS2 up to 2% by volume, said process comprising bringing said gas into contact at a temperature of 100° to 170° C. and in the presence of oxygen with an oxidation catalyst that comprises a substrate and an active phase that comprises iron in a proportion of between 2.5 and 5% of the total weight of the oxidation catalyst in which the active phase of the catalyst also comprises at least one element other than iron that is: titanium, germanium, gallium, antimony, niobium, manganese, vanadium, chromium, phosphorus, bismuth, yttrium, alkali metals, alkaline-earth metals, or rare earths.

8. The process according to claim 7, in which the weight content of elements other than iron is between 1 and 100% relative to the weight of iron on the catalyst.

9. A process in which, in a first step, a gas is brought into contact in the presence of oxygen on the catalyst at a temperature of 100° to 170° C. according to claim 1, then in a second step, the catalyst that is loaded with sulfur is flushed with an oxygen-free gas, at a temperature of between 200 and 500° C.

10. A process for direct oxidation into sulfur and/or into sulfates of sulfur-containing compounds that are contained in a gas and that comprise COS and/or CS2 up to 2% by volume, said process comprising bringing said gas into contact at a temperature that is less than 200° C. and in the presence of oxygen with an oxidation catalyst that comprises a substrate and an active phase that comprises iron in a proportion of between 2.5 and 5% of the total weight of the oxidation catalyst, and at least one of tin, ruthenium, potassium, germanium, gallium, antimony, niobium, manganese, vanadium, chromium, phosphorous, bismuth, yttrium, alkali metals, alkaline earth metals or rare earths.

* * * * *